E. B. FORBUSH.
2 Sheets—Sheet 1.
Harvester.
No. 1,973.
Reissued May 23, 1865.
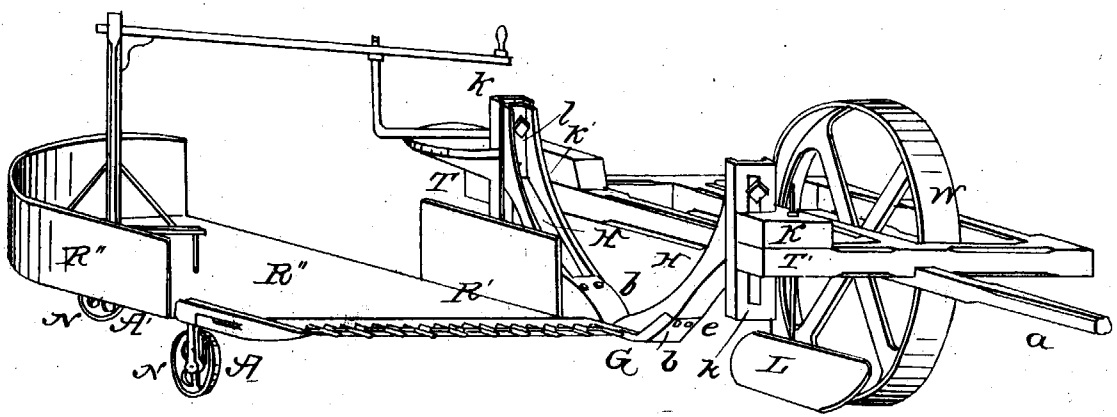
Witnesses.
James H Gudley
Allen T Singleton
Inventor
A. Wheeler Jr
By E. B. Forbush
Atty.
N. PETERS, Photo-Lithographer, Washington, D. C.

E. B. FORBUSH.
2 Sheets—Sheet 2.
Harvester.
No. 1,973.
Reissued May 23, 1865.
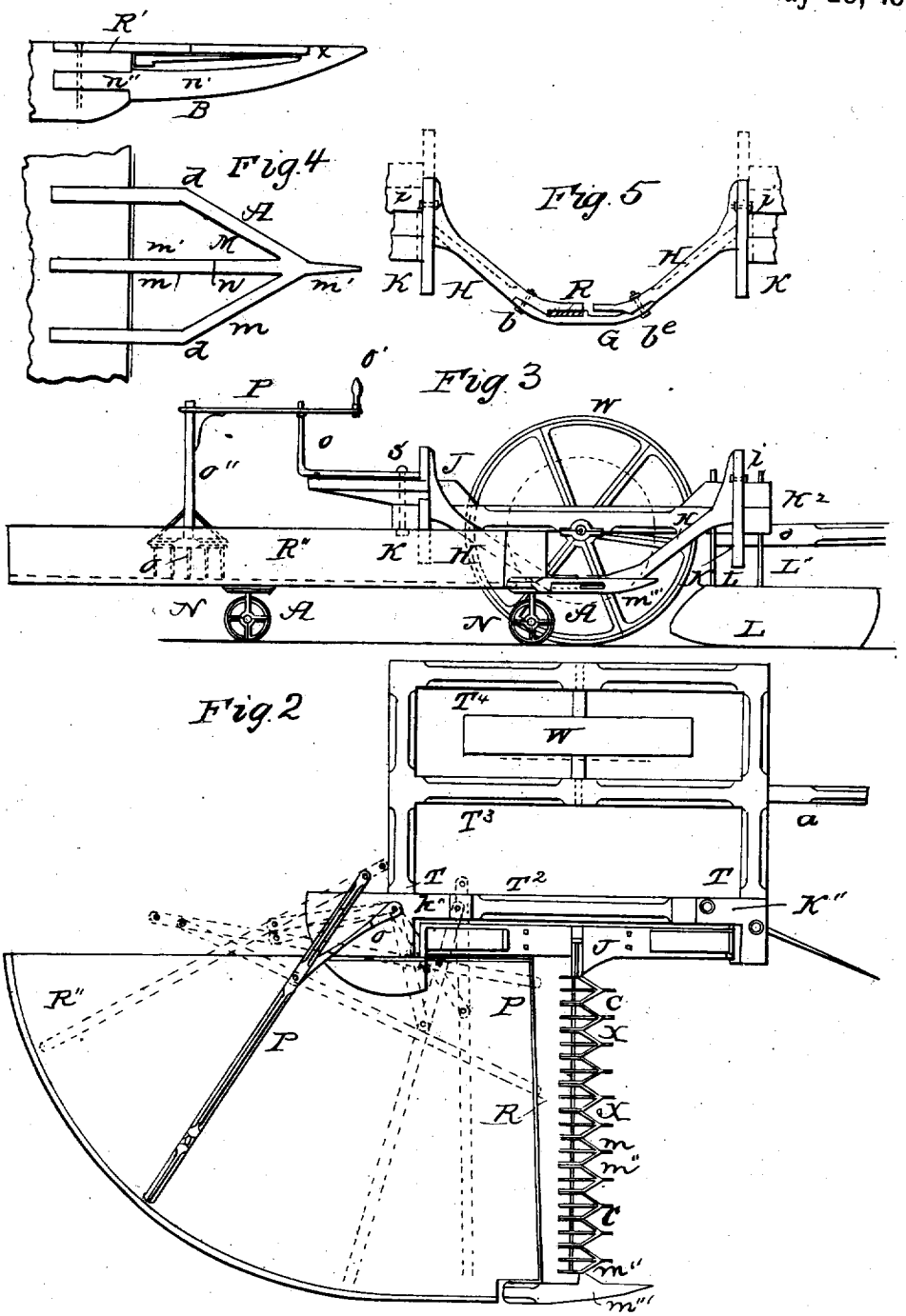
Witnesses
James H. Gudley
Allen T. Langston
Inventor
C. Whiler Jr
By E. B. Forbush
Atty
N. PETERS, Photo-Lithographer, Washington, D. C.

UNITED STATES PATENT OFFICE.

CYRENUS WHEELER, JR., OF POPLAR RIDGE, NEW YORK, ASSIGNEE, BY MESNE ASSIGNMENTS, OF E. B. FORBUSH.

IMPROVEMENT IN HARVESTERS.

Specification forming part of Letters Patent No. 9,134, dated July 20, 1852; Reissue No. 376, dated July 8, 1856; Reissue No. 692, dated April 19, 1859; Reissue No. 1,973, dated May 23, 1865.

DIVISION B.

*To all whom it may concern:*

Be it known that ELIAKIM B. FORBUSH, of the city of Buffalo, in the county of Erie and State of New York, heretofore invented certain new and useful Improvements in Grain and Grass Harvesting Machines, for which Letters Patent of the United States were duly issued to the said FORBUSH on the 20th day of July, 1852, and subsequently reissued on the 8th day of July, 1856, and again reissued on the 19th day of April, 1859, but which said last-mentioned Letters Patent are now deemed to be invalid and inoperative by reason of a defective or insufficient specification. Now, therefore, I, CYRENUS WHEELER, Jr., of Poplar Ridge, in the county of Cayuga and State of New York, assignee, by mesne assignments, of the whole interest of the said Letters Patent and of the said invention and improvements do hereby declare, pursuant to the statute in such case made and provided, that the following is a full and exact description of integral parts of said invention and improvements, so far as described and claimed in this division or branch of said invention, reference being had to the accompanying drawings, making a part of this specification, in which—

Figure I is a perspective view of said improvements, as shown, in a combined reaper and mower adjusted and arranged for reaping. Fig. II is a plan or top view of the same. Fig. III is a side view. Fig. IV is a plan or top view and side view of one of the guard-fingers. Fig. V is a side view of a device called a "clamp," by which the finger-bar is supported.

The nature of said invention, so far as the same relates to this branch or division thereof, consists, first, in making the outer and inner shoe broader at a point thereof for the purpose of forming a lateral brace or support to the guard-fingers; second, in so constructing and arranging skeleton guard-fingers that they mutually brace and support each other forward of the finger-bar; third, in applying and using a bearing-piece on the finger-bar for the outer end of the cutter-bar placed between the outer shoe and outer guard-finger.

The guard-fingers are made in a skeleton form, as shown in Fig. IV, A being a top view thereof, and B a side view.

Experience has proved that in using the common straight guard small particles of fine grass gummy and fibrous matter will (in certain conditions of the grass) work into the slit in the guard and become deposited and packed on the surface of the cutters and in the slit, and often accumulate to such an extent as to clog and wedge the cutters so much as to render the machine inoperative. To remedy this difficulty the guard-finger is so constructed as to form an opening or open spaces in the top thereof, and on both sides of the central bar, *n*, through which the dirt, fine grass, and fibrous matter may escape before it becomes hard and packed between the cutters and guards. To accomplish this, the upper part of the guard is constructed with two outer or overhanging bars, *m m*, as fully shown in Fig. IV. These bars meet and join the central bar at one common point, *m″*. The under half of the guard is composed of one bar, *n′*, having a shank or projecting end, *n″*. The guard is cut or recessed out, as seen at 6, Fig. IV, for the purpose of forming a recess for the cutter-bar to work in.

It will be seen that the overhanging bars *m m* permit a large portion of the stalks of grain or grass being cut or severed at some distance from the center line of the guard, and while the cutters are in that part of their movement where they can exert their greatest power to cut—*i. e.*, a considerable distance from the limit of their throw—while all straws which escape being severed against the overhanging bars may be severed against the central bar and thus render the cutting more sure, easy, and perfect. Those portions of the guard which extend in rear of the angle *d* serve the purpose of scraping up and loosening the gummy and fibrous matter which has a tendency to collect on the cutters back of their cutting-edges, and as these parts extend back onto the finger-bar, as seen in Fig. II, the gummy matter which is scraped up has a free exit on the finger-bar or may fall out below through the spaces between the cutters and finger-bar. This construction also enables the guards to mutually brace and support each other when in place on the finger-bar, as shown in Fig. II, and hence they are less liable to bend or break than if each guard stood alone and unsupported.

It will also be seen that provision is made for bracing the guards against the outer shoe or divider, and also against inner shoe or clamp, so that the guards are braced and supported laterally by the inner and outer shoe. This is accomplished by widening out the inner shoe or clamp, as shown at J, which projecting part meets and braces against the overhanging or brace part of the guard-finger, (at the point *d*,) as shown in Fig. II; also, in widening out the outer shoe in one point thereof, as shown at *m'''*, which projecting piece meets and braces against the opposite overhanging brace-bar of the guard (at the point *d*) at the outer end of the finger-bar, and thus the outer and inner shoes mutually brace and support the guards against side or lateral strain, all of which is shown in Fig. II. These projections also afford cutting-edges against which the cutters act to cut or sever any stalks of grain or grass which come into the space between the guard and shoe, and which are not cut against the guard, and thus the cutting of all stalks of grain or grass which come into these spaces is insured, and all danger of the cutters becoming clogged either in the outer or inner shoe is obviated. These guards may by made of wrought-iron by forging or by casting from hard iron or from malleableized iron, or by making the upper half of steel and casting the lower part, and then braze or otherwise fasten the two parts together at the point. By the use of steel in one part of the guard a steel cutting-edge is obtained in the guard, which, acting with the vibrating cutters to form a shear-cut, insures the severing of the stalks of grain or grass in the most perfect manner. By making guards in this skeleton form, lightness and strength are combined, with sufficient width to mutually brace and support each other when arranged in their proper position on the finger-bar.

In order to support and protect the outer end of the cutter-bar between the outside shoe and guard-finger a bearing-piece, Z, is provided and arranged in front of the finger-bar, (and is fastened thereto,) so that the outer end of the cutter-bar will be thereby supported at the extremity of its inner throw or vibration.

In Fig. I the machine is represented as used for reaping grain. To adjust it for cutting grass or to be used as a mower, the removable platform R'', the raking apparatus, and the supporting-wheels N A and N A' are detached and removed, and the finger-bar and clamp lowered, so that the shoe G will rest upon the ground, and then the clamp is made fast in the frame, which clamp or shoe, together with the driving-wheel, will support the frame of the machine in its proper upright position, with the finger-bar resting upon the ground in the proper position for mowing. All this is but the work of a few minutes, and is so simple that any common laborer can make the change. The cutters are operated in a common manner by suitable mechanism connected with the driving-wheel.

Having now fully described the said invention in the integral parts thereof embraced in this division, and having complied with the statute authorizing the grant of a separate patent for each or either distinct part or branch of the original invention, what I claim in this division as the invention of the said FORBUSH, and desire to secure by these Letters Patent, is—

1. Making the outer and inner shoes broader in front of the finger-bar, as shown at J and *m'''*, for the purpose of bracing the guard-fingers laterally.

2. So constructing skeleton guard-fingers and arranging them on the finger-bar that they will mutually brace and support each other forward of the finger-bar, substantially as set forth.

3. The bearing-piece Z, placed between the outer shoe and guard-finger for the support of the outer end of the cutter-bar, substantially as described.

In testimony whereof I hereunto subscribe my name in the presence of two witnesses.

C. WHEELER, JR.

Witnesses:
W. H. MEAKER,
WM. ALLEN.